US011244035B2

(12) United States Patent
Bapst et al.

(10) Patent No.: US 11,244,035 B2
(45) Date of Patent: Feb. 8, 2022

(54) APPARATUS AND METHODS FOR BIOMETRIC VERIFICATION

(71) Applicant: QUALCOMM Incorporated, San Diego, CA (US)

(72) Inventors: Aleksander Bapst, San Diego, CA (US); Christopher Alan Pagnotta, Carlsbad, CA (US); Ryan Lafleur, Wheaton, IL (US); Evan James Peterson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 16/175,759

(22) Filed: Oct. 30, 2018

(65) Prior Publication Data

US 2020/0134145 A1 Apr. 30, 2020

(51) Int. Cl.
*G06F 21/32* (2013.01)
*G06F 21/45* (2013.01)

(52) U.S. Cl.
CPC .............. *G06F 21/32* (2013.01); *G06F 21/45* (2013.01)

(58) Field of Classification Search
CPC ................................ G06F 21/32; G06F 21/45
USPC .......................................................... 726/18
See application file for complete search history.

(56) References Cited

U.S. PATENT DOCUMENTS

| 7,330,566 B2* | 2/2008 | Cutler ................ G06K 9/00348 382/103 |
| 2008/0049988 A1* | 2/2008 | Basile ..................... G07C 9/37 382/124 |
| 2013/0259330 A1* | 10/2013 | Russo ................ G06K 9/00013 382/124 |
| 2014/0222678 A1* | 8/2014 | Sheets ..................... G10L 17/00 705/44 |
| 2014/0282877 A1* | 9/2014 | Mahaffey .............. H04W 12/08 726/3 |
| 2015/0112603 A1* | 4/2015 | Zhong ................ G06K 9/00348 702/19 |
| 2016/0147841 A1* | 5/2016 | Gray .................... A61B 5/6807 600/592 |
| 2016/0182503 A1* | 6/2016 | Cheng .................. G06F 21/316 726/7 |
| 2016/0337863 A1* | 11/2016 | Robinson .............. H04W 4/021 |
| 2017/0011210 A1* | 1/2017 | Cheong .................. G06F 21/32 |

(Continued)

OTHER PUBLICATIONS

Xu, Weitao, et al. "Gait-watch: A context-aware authentication system for smart watch based on gait recognition." Proceedings of the Second International Conference on Internet-of-Things Design and Implementation. 2017. (Year: 2017).*

(Continued)

*Primary Examiner* — Syed A Zaidi
(74) *Attorney, Agent, or Firm* — Qualcomm Incorporated (57) ABSTRACT

Example apparatus and methods may include: (1) a system and method for enrolling a single user's gait pattern using only accelerometer magnitude data; (2) an efficient and low-power method for continuously generating biometric match scores against the enrolled model at run-time using two phases: detection and authentication; (3) an adaptive method for continuously updating the user model by comparing temporary models generated at regular intervals to the canonical user model; and (4) accelerometer samples captured on a wearable and streamed to a mobile device for further processing.

8 Claims, 10 Drawing Sheets

(56) References Cited

U.S. PATENT DOCUMENTS

| | | | | |
|---|---|---|---|---|
| 2017/0185765 A1* | 6/2017 | Pang | .................. | H04L 63/0861 |
| 2018/0078179 A1* | 3/2018 | Deng | ..................... | A61B 5/112 |
| 2019/0384898 A1* | 12/2019 | Chen | ....................... | G06F 3/017 |

OTHER PUBLICATIONS

NPL Search Results (Year: 2020).*
Khusumanegara, Priagung. "Smartphone User Identification Using Behavior Model Based on Smartphone Life-Logs Data." (2016). (Year: 2016).*
Wang, Bingyue. "Learning Device Usage in Context: A Continuous and Hierarchical Smartphone Authentication Scheme." (2016). (Year: 2016).*
NPL Search Terms (Year: 2021).*
Plurilock, "EDR Using Behavioral Biometrics—Plurilock DEFEND—Invisible and Frictionless", retrieved from the internet, URL: https://www.plurilock.com/products/biotracker-defend-edr/, on Nov. 6, 2018, 5 Pages.

* cited by examiner

APPARATUS AND METHODS FOR BIOMETRIC VERIFICATION

FIELD OF DISCLOSURE

This disclosure relates generally to biometrics, and more specifically, but not exclusively, to gait biometrics.

BACKGROUND

Biometrics is the technical term for body measurements and calculations. It refers to metrics related to human characteristics. Biometrics authentication (or realistic authentication) is used in computer science as a form of identification and access control. It is also used to identify individuals in groups that are under surveillance.

Biometric identifiers are the distinctive, measurable characteristics used to label and describe individuals. Biometric identifiers are often categorized as physiological versus behavioral characteristics. Physiological characteristics are related to the shape of the body. Examples include, but are not limited to fingerprint, palm veins, face recognition, DNA, palm print, hand geometry, iris recognition, retina and odor/scent. Behavioral characteristics are related to the pattern of behavior of a person, including but not limited to typing rhythm and voice.

More traditional means of access control include token-based identification systems, such as a driver's license or passport, and knowledge-based identification systems, such as a password or personal identification number. Since biometric identifiers are unique to individuals, they are more reliable in verifying identity than token and knowledge-based methods; however, the collection of biometric identifiers raises privacy concerns about the ultimate use of this information.

Many different aspects of human physiology, chemistry or behavior can be used for biometric authentication. The selection of a particular biometric for use in a specific application involves a weighting of several factors. For example, the following seven such factors may be used when assessing the suitability of any trait for use in biometric authentication. Universality means that every person using a system should possess the trait. Uniqueness means the trait should be sufficiently different for individuals in the relevant population such that they can be distinguished from one another. Permanence relates to the manner in which a trait varies over time. More specifically, a trait with 'good' permanence will be reasonably invariant over time with respect to the specific matching algorithm. Measurability (collectability) relates to the ease of acquisition or measurement of the trait. In addition, acquired data should be in a form that permits subsequent processing and extraction of the relevant feature sets. Performance relates to the accuracy, speed, and robustness of technology used (see performance section for more details). Acceptability relates to how well individuals in the relevant population accept the technology such that they are willing to have their biometric trait captured and assessed. Circumvention relates to the ease with which a trait might be imitated using an artifact or substitute.

Accordingly, there is a need for systems, apparatus, and methods that improve upon conventional approaches including the methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for biometric verification includes: detecting, by an accelerometer, a plurality of samples; determining, by a mobile device coupled to the accelerometer, a gait based on the plurality of samples; determining if an authorized user of the mobile device is enrolled; if the authorized user of the mobile device is determined to be not enrolled: extracting a plurality of gait segments from the plurality of samples; detecting a plurality of peaks in the gait segments; extracting a plurality of inter-peak segments from the plurality of gait segments; interpolating the plurality of inter-peak segments to a preset length; and storing an enrollment model of the authorized user in a memory of the mobile device, wherein the enrollment model is based on the interpolated plurality of inter-peak segments.

In another aspect, a non-transitory computer-readable medium comprising instructions that when executed by a processor cause the processor to perform a method comprising: detecting, by an accelerometer, a plurality of samples; determining, by a mobile device coupled to the accelerometer, a gait based on the plurality of samples; determining if an authorized user of the mobile device is enrolled; if the authorized user of the mobile device is determined to be not enrolled: extracting a plurality of gait segments from the plurality of samples; detecting a plurality of peaks in the gait segments; extracting a plurality of inter-peak segments from the plurality of gait segments; interpolating the plurality of inter-peak segments to a preset length; and storing an enrollment model of the authorized user in a memory of the mobile device, wherein the enrollment model is based on the interpolated plurality of inter-peak segments.

In still another aspect, an apparatus for biometric verification comprises: an accelerometer configured to detect a plurality of samples; a processor coupled to the accelerometer, the processor configured to: determine a gait based on the plurality of samples; determine if an authorized user of the apparatus is enrolled; if the authorized user is determined to be not enrolled: extract a plurality of gait segments from the plurality of samples; detect a plurality of peaks in the gait segments; extract a plurality of inter-peak segments from the plurality of gait segments; interpolate the plurality of inter-peak segments to a preset length; and storie an enrollment model of the authorized user in a memory of the mobile device, wherein the enrollment model is based on the interpolated plurality of inter-peak segments.

In still another aspect, a method for biometric verification includes: detecting, by an accelerometer, a plurality of samples; determining, by a mobile device, if the plurality of samples indicates a gait; and when the gait is determined: determining if an authorized user of the mobile device is enrolled; when the authorized user of the mobile device is not enrolled: collecting an initial plurality of gait samples; determining a peak for the initial plurality of gait samples; extracting inter-peak segments for the initial plurality of gait samples; interpolating the inter-peak segments of the initial plurality of gait samples to a preset length; generating an initial user model based on the interpolated inter-peak segments of the initial plurality of gait samples; and authenticating the user of the mobile device; when the authorized user of the mobile device is enrolled: selecting a current user model; collecting a first plurality of gait samples; determining a peak for the first plurality of gait samples; extracting inter-peak segments for the first plurality of gait samples; interpolating the inter-peak segments of the first plurality of gait samples to a preset length; determining if the interpolated inter-peak segments of the first plurality of gait samples matches the initial user model; authenticating the user of the mobile device when the interpolated inter-peak segments of the first plurality of gait samples match the initial user model; and after authenticating the user of the mobile device; collecting a current plurality of gait samples; determining a peak for the current plurality of gait samples; extracting inter-peak segments for the current plurality of gait samples; interpolating the inter-peak segments of the current plurality of gait samples to a preset length; determining if the interpolated inter-peak segments of the current plurality of gait samples matches the current user model; generating an updated user model based on the interpolated inter-peak segments of the current plurality of gait samples when the interpolated inter-peak segments of the current plurality of gait samples do not match the current user model.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein mitigate shortcomings of the conventional methods, apparatus, and systems, as well as other previously unidentified needs. User authentication based on gait may be a valuable verifier for biometric security systems, either on its own or as a supplement to other biometrics (e.g., face, voice). Gait has the following advantages as a biometric: walking patterns are generally unique among users; a large amount of identity data can be passively collected as the user goes about their daily activities; a relatively small amount of sensor bandwidth is needed (accelerometer and/or gyroscope) compared to what is required for biometrics that record images or audio. This may allow processing to be relatively easily moved onto subsystems that require less power, enabling efficient continuous streaming of data. In addition, accelerometer data may also be streamed over Bluetooth™ peripherals (e.g., watch) to a mobile device.

Examples may include (1) a system and method for enrolling a single user's gait pattern may only use accelerometer magnitude data; (2) an efficient and low-power method for continuously generating biometric match scores against the enrolled model at run-time using two phases: detection and authentication; (3) an adaptive method for continuously updating the user model by comparing temporary models generated at regular intervals to the canonical user model; and (3) accelerometer samples may be captured on a wearable device and streamed to another device, such as a mobile device, for further processing.

There are two basic modes of a biometric system. First, in verification (or authentication) mode, the system performs a one-to-one comparison of a captured biometric with a specific template stored in a biometric database in order to verify the individual is the person they claim to be. Three steps may be optionally involved in the verification of a person. In the first step, reference models for all the users are generated and stored in the model database. In the second step, some samples are matched with reference models to generate the genuine and impostor scores and calculate the threshold. The third step is the testing step. This process may use a smart card, username or ID number (e.g., PIN) to indicate which template should be used for comparison. 'Positive recognition' is a common use of the verification mode, "where the aim is to prevent multiple people from using the same identity".

Second, in identification mode, the system performs a one-to-many comparison against a biometric database in an attempt to establish the identity of an unknown individual. The system will succeed in identifying the individual if the comparison of the biometric sample to a template in the database falls within a threshold that may be previously set. Identification mode can be used either for 'positive recognition' (so that the user does not have to provide any information about the template to be used) or for 'negative recognition' of the person "where the system establishes whether the person is who she (implicitly or explicitly)

denies to be". The latter function can only be achieved through biometrics since other methods of personal recognition such as passwords, PINs or keys are ineffective.

The first time an individual uses a biometric system is called enrollment. During the enrollment, biometric information from an individual is captured and stored. In subsequent uses, biometric information is detected and compared with the information stored at the time of enrollment. Note that storage and retrieval of such systems themselves should be secure if the biometric system is to be robust. The first block (sensor) is the interface between the real world and the system; it has to acquire all the necessary data. Most of the time it is an image acquisition system, but it can change according to the characteristics desired. The second block performs all the necessary pre-processing: it has to remove artifacts from the sensor, to enhance the input (e.g., removing background noise), to use some kind of normalization, etc. In the third block necessary features are extracted. This step is an important step as the correct features need to be extracted in the optimal way. A vector of numbers or an image with particular properties is used to create a template. A template is a synthesis of the relevant characteristics extracted from the source. Elements of the biometric measurement that are not used in the comparison algorithm may be discarded in the template to reduce the file size and to protect the identity of the enrollee.

During the enrollment phase, the template is simply stored somewhere (on a card or within a database or both). During the matching phase, the obtained template is passed to a matcher that compares it with other existing templates, estimating the distance between them using any algorithm (e.g., Hamming distance). The matching program will analyze the template with the input. This will then be output for any specified use or purpose (e.g., entrance in a restricted area). Selection of biometrics in any practical application depends upon the characteristic measurements and user requirements. In selecting a particular biometric, factors to consider include, performance, social acceptability, ease of circumvention and/or spoofing, robustness, population coverage, size of equipment needed and identity theft deterrence. Selection of a biometric based on user requirements considers sensor and device availability, computational time and reliability, cost, sensor size and power consumption. Gait, for example, may be used as a biometric trait.

Figure 1:
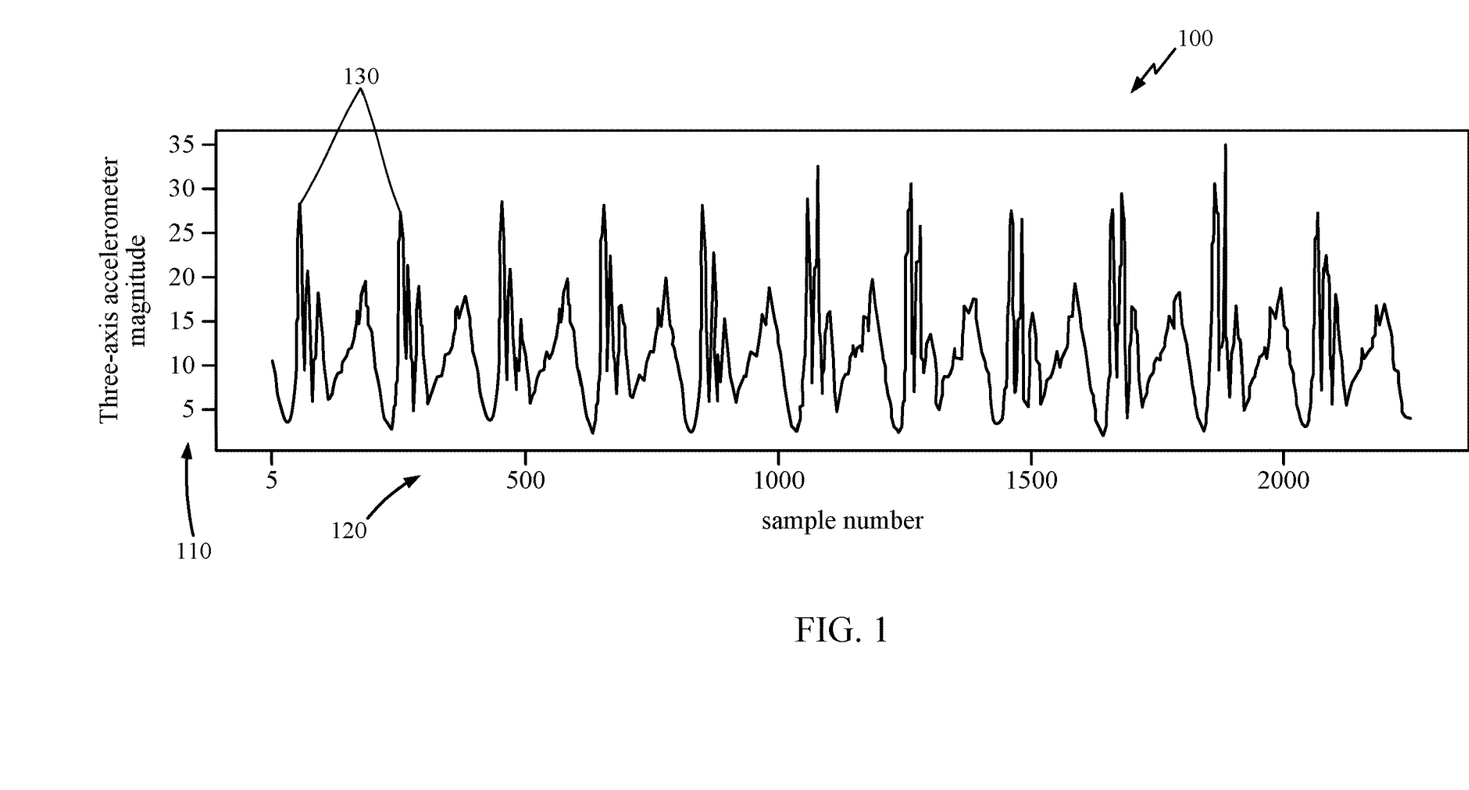
FIG. 1 illustrates an exemplary accelerometer gait signal in accordance with some examples of the disclosure.

FIG. 1 illustrates an exemplary accelerometer gait signal in accordance with some examples of the disclosure. As shown in FIG. 1, accelerometer data 100 collected by an accelerometer (e.g., accelerometer 981 in FIG. 9) worn or held by a user while the user is walking is illustrated. The accelerometer data 100 may include a plurality of samples plotted against a vertical axis 110 indicating accelerometer magnitude versus a horizontal axis 120 indicating an accelerometer sample number. The accelerometer data 100 may include a plurality of peak magnitude points 130. The peak magnitude points 130 may indicate a heel strike of a user wearing or hold an accelerometer device.

Figure 2:
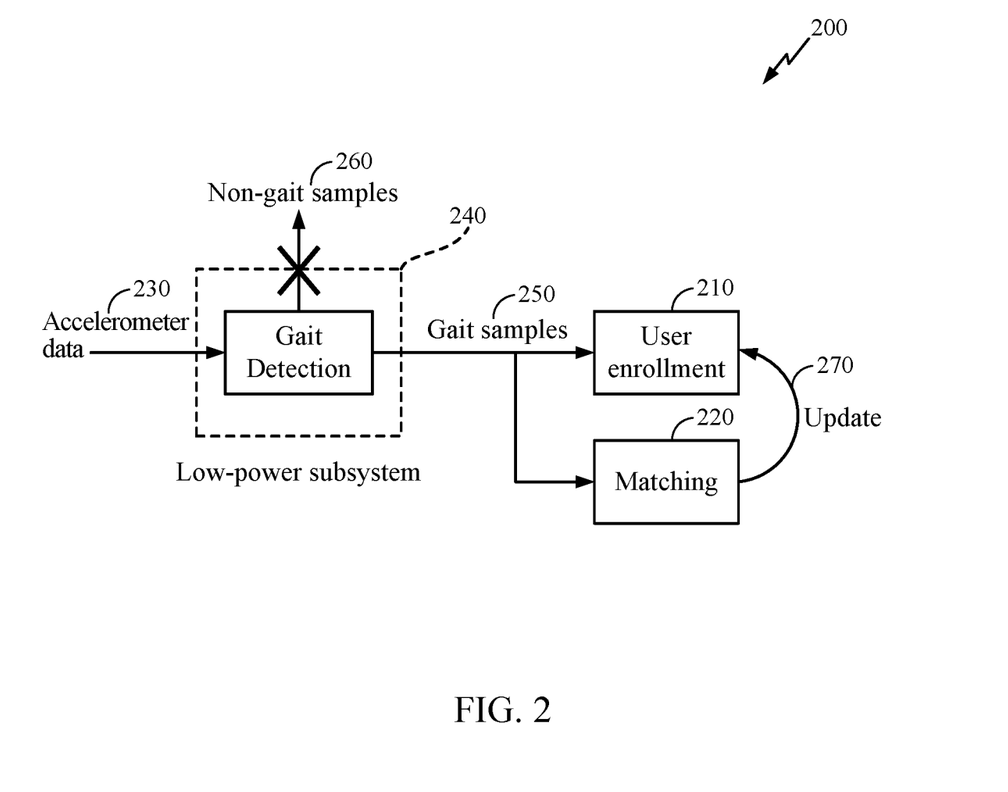
FIG. 2 illustrates an exemplary gait authentication in accordance with some examples of the disclosure.

FIG. 2 illustrates an exemplary gait authentication in accordance with some examples of the disclosure. As shown in FIG. 2, gait authentication 200 may consist of two phases: user enrollment 210 and matching 220. During both phases, accelerometer data 230 (e.g., accelerometer magnitude samples) may be streamed continuously at a constant rate (e.g., 100-200 Hz for optimum performance) to a Processing Unit (PU) 240 (e.g., processor 901 in FIG. 9 or a sensor low power island). The accelerometer waveform is first processed using gait detection. One purpose of detection is to save on computation by only waking up the PU 240 for further computations when walking is detected at 250, and discarding the samples otherwise at 260. Samples that are classified as walking may be buffered and used for user enrollment 210 and matching 220. The user enrollment 210 and matching 220 may be accomplished by using the PU 240.

Gait detection may be processed on the same hardware as the user enrollment 210 and matching 220, or it may be performed on a separate subsystem such as Snapdragon's sensor low power island (SLPI) using the ContextHub runtime environment. This results in an extremely low power passive biometric. Information gathered during matching 220 can also be used to update 270 the user enrollment 210.

Figure 3:
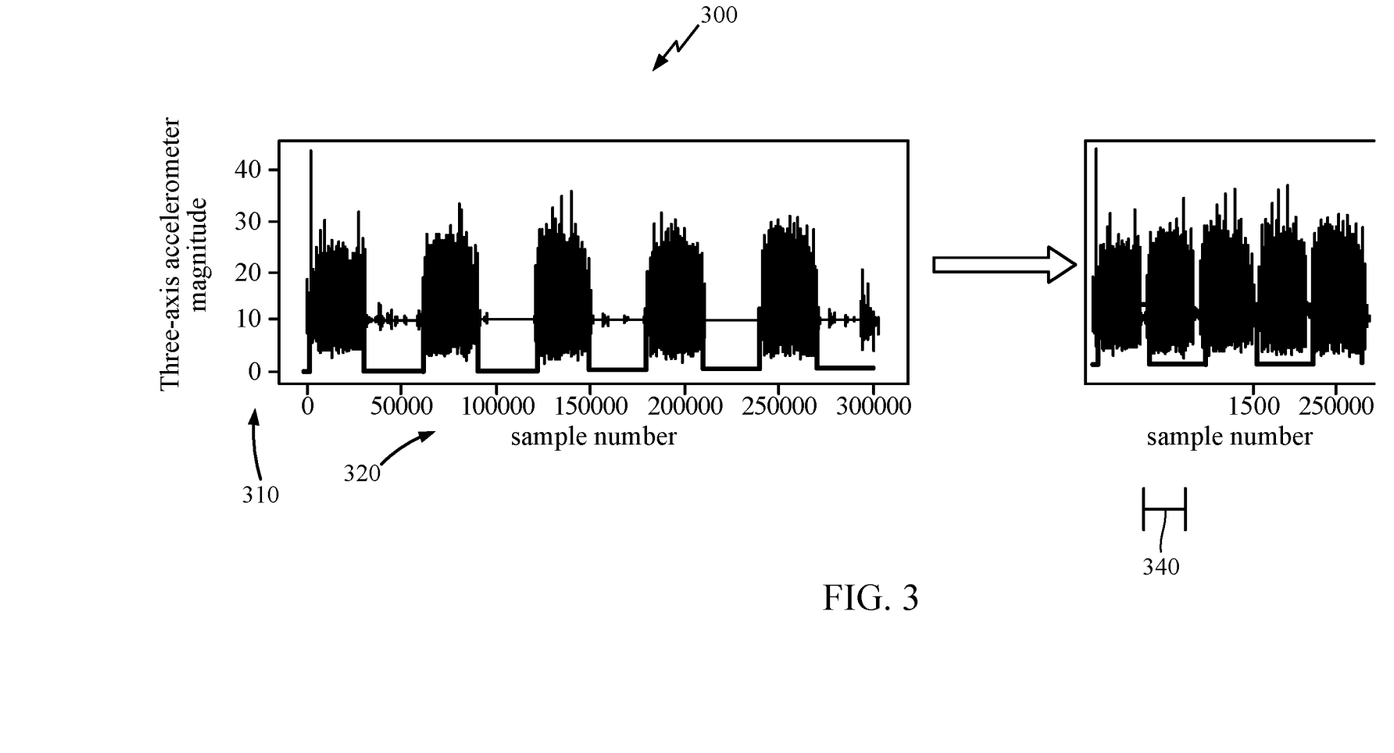
FIG. 3 illustrates an exemplary gait detection in accordance with some examples of the disclosure.

FIG. 3 illustrates an exemplary gait detection in accordance with some examples of the disclosure. As shown in FIG. 3, accelerometer data 300 (e.g., accelerometer data 100) may include a plurality of samples plotted against a vertical axis 310 indicating accelerometer magnitude versus a horizontal axis 320 indicating an accelerometer sample number.

For gait detection, accelerometer data 300 may be split into segments using a sliding window 340 with a width of 4 s and stride of 1 s, for example. For each sliding window 340, low-frequency wavelet features may be extracted using a four-layer deep discrete wavelet transform (DWT) as is well known in the art by sending the sliding windows 340 to a processor (e.g., processor 901) or PU (e.g., PU 240). Feature vectors may be classified using a binary support vector machine (SVM) in the processor or PU. The SVM model may be pre-trained on a large set of data from many users and may be stored on the device. As mentioned above, gait detection using a SLPI at 100 MHz and 200 MHz may reduce the power consumption to approximately 3 mW from almost 60 mW using a 100 MHz processor and almost 90 mW using a 200 MHz processor.

Figure 4:
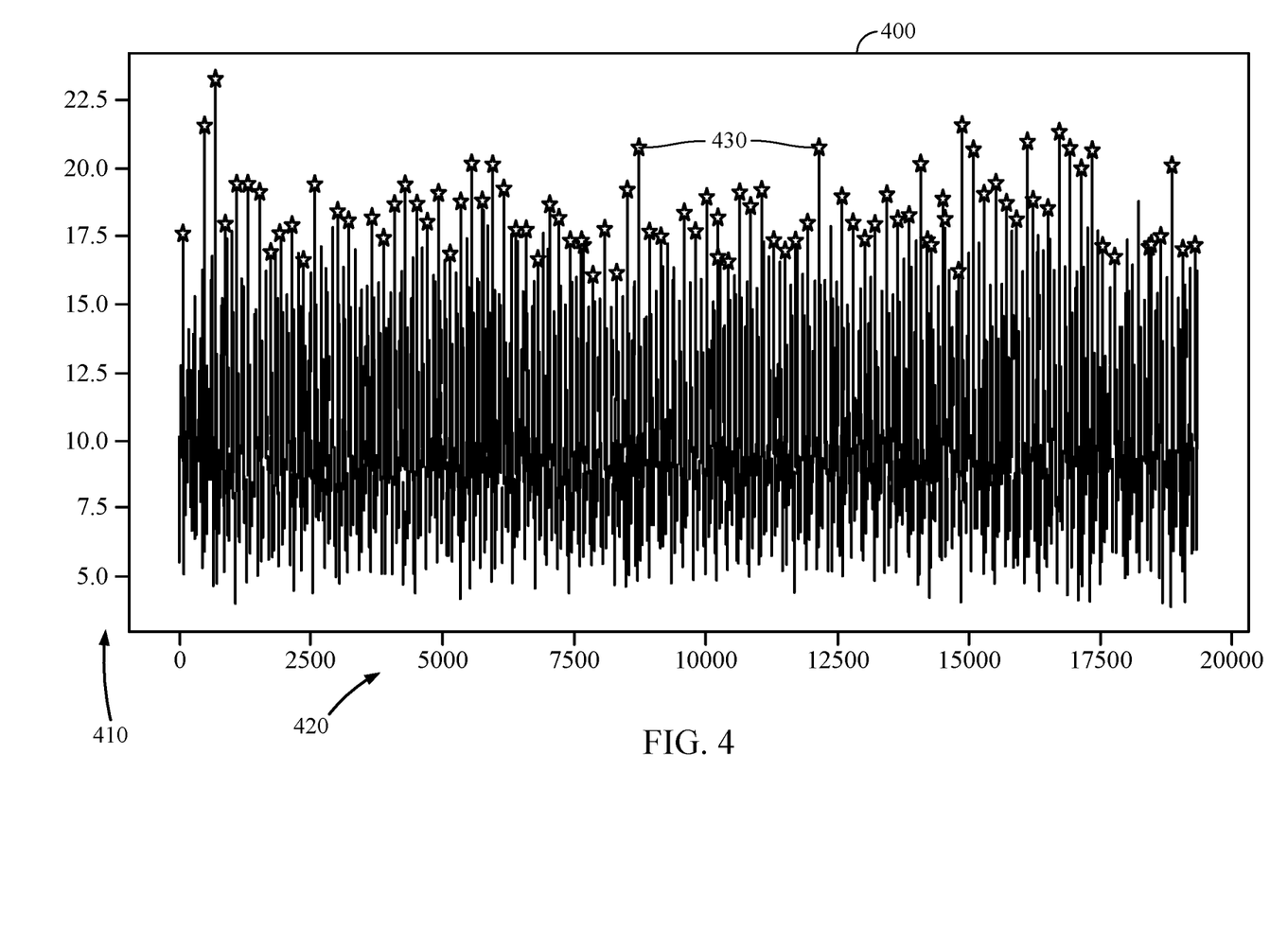
FIG. 4 illustrates an exemplary enrollment in accordance with some examples of the disclosure.

FIG. 4 illustrates an exemplary enrollment in accordance with some examples of the disclosure. As shown in FIG. 4, accelerometer data 400 (e.g., accelerometer data 100 and accelerometer data 300) may be collected using an accelerometer (e.g., accelerometer 981). The accelerometer data 400 may include a plurality of samples plotted against a vertical axis 410 indicating accelerometer magnitude versus a horizontal axis 420 indicating an accelerometer sample number. The accelerometer data 400 may include a plurality of peak magnitude points 430. The peak magnitude points may indicate a heel strike of a user wearing or hold an accelerometer device.

When enrolling a user, samples that have been classified as walking may be buffered (e.g., by a ring buffer) and processed (e.g., by a processor or PU) to extract gait segments (e.g., sliding windows 340). These segments represent a user's unique gait pattern and may be interpolated to an equal length (100 samples, for example). The process of extracting gait segments and performing an enrollment may involve:

1. Peak detection.
2. Extraction of inter-peak segments and interpolation of segments to a preset length.
3. Storage of gait segments in a buffer (e.g., ring buffer).

Steps 1-2 may be performed in a pipeline fashion for increased performance. During enrollment, the user walks until a certain number of gait segments have been collected.

Figure 5:
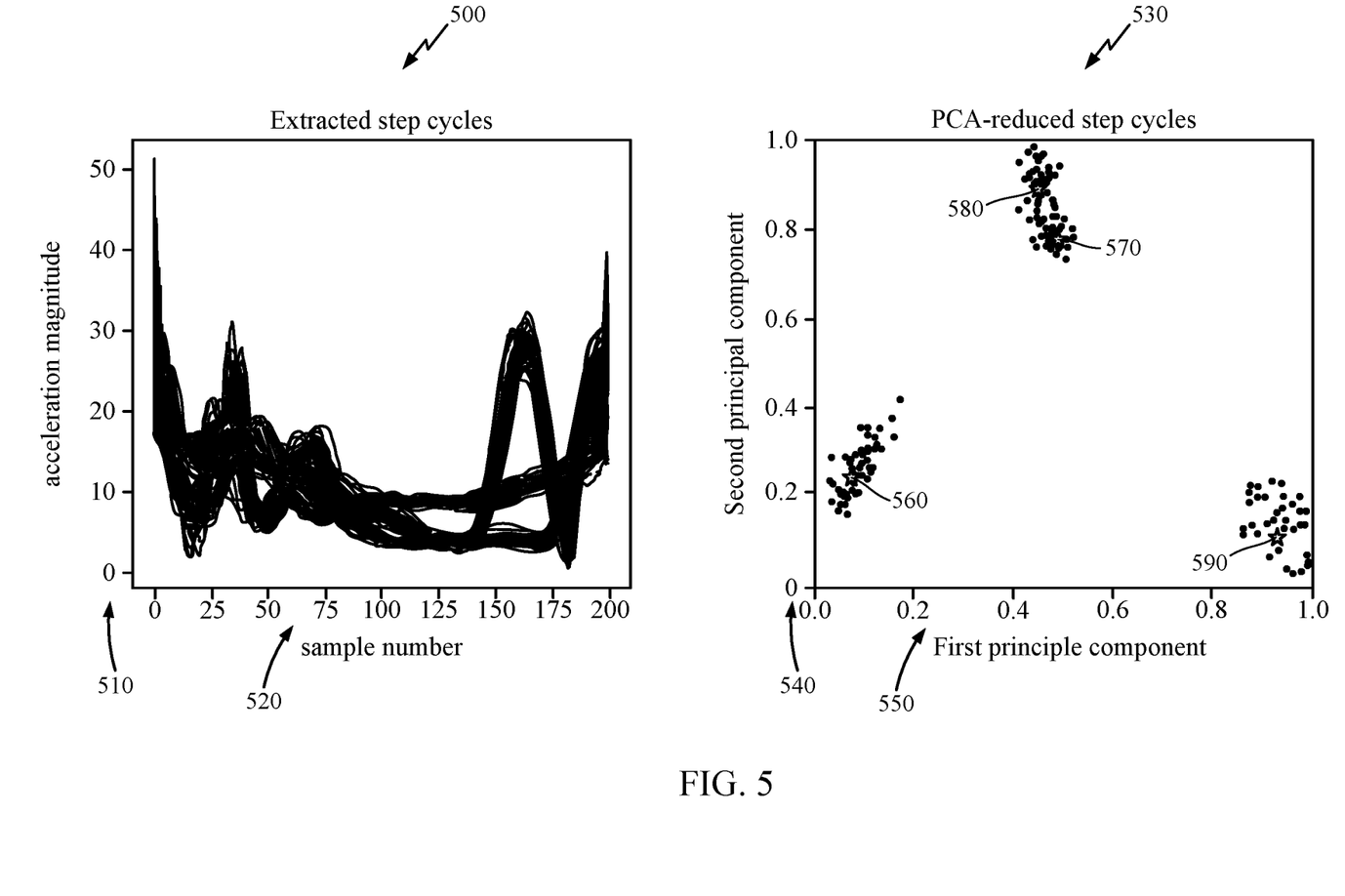
FIG. 5 illustrates an exemplary gait segmentation in accordance with some examples of the disclosure.

FIG. 5 illustrates an exemplary gait segmentation in accordance with some examples of the disclosure. As shown in FIG. 5, a plurality of clustered step segments 500 are plot against a vertical axis 510 indicating accelerometer magnitude versus a horizontal axis 520 indicating an accelerometer sample number. This shows an example of clustered step segments collected over a two-minute user enrollment period, interpolated to a length of 100 segments. The color of the segments corresponds to the cluster membership. FIG. 5 also shows the same clustered step segments 530 reduced from 100 to 2 dimensions using principle component analysis colored according to the clusters detected by a density based clustering algorithm, such as DBSCAN, that are plotted against a vertical axis 540 indicating a second principle component and a horizontal axis 550 indicating a first principle component. A plurality of cluster centroids are marked with a red dot including a first centroid 560, a second centroid 570, a third centroid 580, and a fourth centroid 590.

During enrollment, the user walks until a certain number of gait segments have been collected. The gait segments are then collected in an N×M feature matrix, where N is the number of collected segments and M is the sample length of the segments. The matrix is scaled column-wise between 0 and 1. The scaling parameters $S_{min}$ and $S_{max}$ are saved. The DBSCAN clustering algorithm is then used to cluster the scaled rows of the matrix into groups of segments that have similar shape (i.e., that represent repetitive motion in the user's walking patterns). The centroids of the detected clusters $C=\{C_1 \ldots C_K\}$ are saved along with $S_{min}$ and $S_{max}$ to form the user enrollment model.

DBSCAN is a density-based clustering algorithm that takes two parameters, E and N. The number of clusters does not need to be predetermined. E is the minimum distance for two points to be considered neighbors, and N is the minimum number of neighbors required for a point to be a member of a cluster. Points that are not labeled by DBSCAN to be within a cluster are discarded as outliers.

The purpose of scaling the features M is to constrain the gait segments within a hypercube with side length equal to 1, enabling E to be defined globally. In this case, the minimum DBSCAN distance $E_{min}$ is 0 and the maximum distance $E_{max}$ is $M^{1/2}$. If the number of detected clusters $K<K_{min}$, the enrollment is rejected and the user must try again. This provides a mechanism for ensuring enrollment quality.

Figure 6:
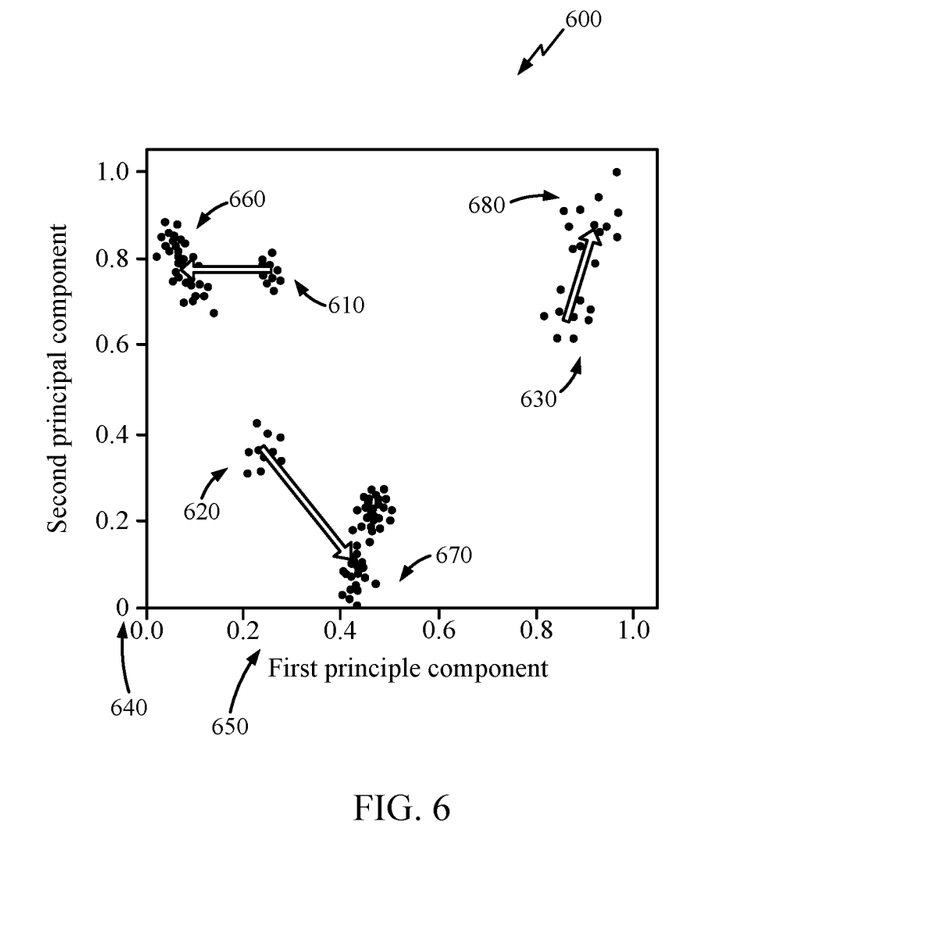
FIG. 6 illustrates an exemplary cluster-to-cluster matching in accordance with some examples of the disclosure.

FIG. 6 illustrates an exemplary cluster-to-cluster matching in accordance with some examples of the disclosure. As shown in FIG. 6, a plurality of clustered step segments 600 (e.g., clustered step segments 530) may be plotted against a vertical axis 640 indicating a second principle component and a horizontal axis 650 indicating a first principle component. As shown a first cluster of step segments 610 may be matched to a first enrollment cluster 660, a second cluster of step segments 620 may be matched to a second enrollment cluster 670, and a third cluster of step segments 630 may be matched to a third enrollment cluster 680. This will allow detected cluster segments to be matched to an enrollment cluster to verify a current user's detected step clusters with the user's enrollment sample.

For generating matching scores, matching against an enrolled user model at run-time may consists of the same steps as in enrollment, however the gait segments may be generated continuously and buffered over a smaller window of time. For example, if the enrollment model was generated by clustering 200 gait segments, matching may generate clusters over only the previous 40 gait segments at any time. The E and N parameters for DBSCAN, as well as the minimum cluster number K may be set to values that are less strict than those used for enrollment. In other words, at any point time, a quick gait cluster template is generated.

The match score is defined as a cluster-to-cluster comparison of cluster centroids $C_M$ generated at a given instant in time to the enrollment cluster centroids $C_N$. More formally, given the M×N pairwise Euclidean distance matrix D between $C_M$ and $C_N$, the match score S can be defined as the average minimum distance between every match centroid and every enrollment model centroid where $D_i$ is a row of the distance matrix D: S=1/M times the summation from i∈M of argmin($D_i$).

As shown in FIG. 6's graphical representation of a cluster-to-cluster matching scheme, the number of clusters detected at match time does not have to equal the number of enrollment clusters and may be as few as 1. Also, more than one match cluster may match to the same enrollment cluster as clusters are readily matched to the closest neighbor. In addition, impostors will have larger match scores, genuine matches will have small scores. Furthermore, gait detection may be important as it throws out accelerometer samples that would generate gait segment clusters. Gait segments in volatile memory may be timestamped so that segments can be discarded if the device is idle for a defined period.

Apparatus and methods described herein may use continuous enrollment that may include a mechanism for adaptively updating the enrollment model for a user. The user's gait patterns may drift over time, or change suddenly due to injury. The canonical model is enrolled initially at the beginning, and therefore the system computes a running update model continuously in the background using the canonical model as the starting point. To preserve security, the system may notify the user if an updated model is available (e.g., "I noticed your gait has changed"). The user may then be prompted to re-authenticate in order for the updated model to replace the canonical model.

One exemplary mechanism for generating updated enrollment models will now be described. New models $M_t$ may be generated in the background at regular intervals using the normal user enrollment method described above. A new model $M_t$ may be compared with a previous model $M_{t-1}$ and an updated model $M_F$ may be created that is Fusion ($M_t$, $M_{t-1}$), where Fusion is defined as follows:

Clusters in $M_t$ that are within a minimum pre-defined distance of any cluster in $M_{t-1}$ are added to $M_F$. The cluster in $M_{t-1}$ that was within the minimum distance is not add to $M_F$.

Clusters in $M_t$ that are farther away than a minimum pre-defined distance from any cluster in $M_{t-1}$ are added to $M_F$.

A running count is kept of how many times each cluster in $M_{t-1}$ has been matched against. If the number of clusters in $M_F$ exceeds a maximum limit, then the oldest clusters (ones with smallest number of matches) are removed until the number is under the limit, or by some similar age-tracking policy. The purpose of this rule is to limit the total size of the continuously updated model and remove clusters that are too old.

Scaling parameters $S_{min}$ and $S_{max}$ are carried over from $M_{t-1}$.

If $M_F$ does not have any clusters after applying the above rules, $M_F$ is set to $M_{t-1}$ and the user is not notified of a pending update.

Figure 7:
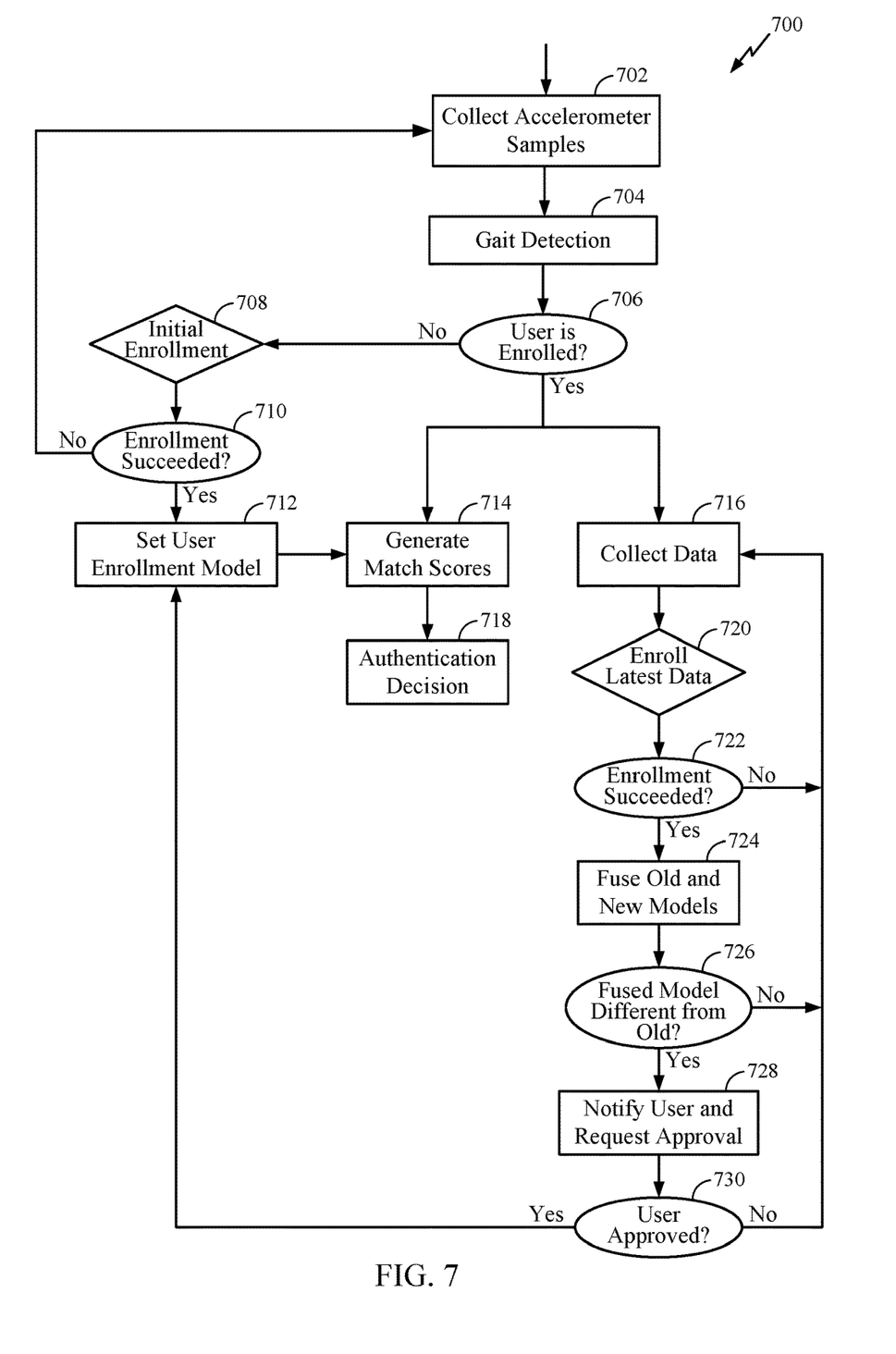
FIG. 7 illustrates an exemplary partial method of enrollment and authentication in accordance with some examples of the disclosure.

FIG. 7 illustrates an exemplary partial method of enrollment and authentication in accordance with some examples of the disclosure. As shown in FIG. 7, the partial method 700 begins with collecting accelerometer samples in block 702. The partial method 700 continues with gait detection in block 704 followed by a determination of whether the user is enrolled in block 706. The gait detection 704 and determination of user enrollment 706 may use any of the methods or apparatus described herein. If a determination is made that the user is not enrolled, the partial method 700 continues with an initial enrollment process 708. Following block 708, a determination at 710 is made if the enrollment was not successful (e.g., not enough valid gait samples detected in block 704), the partial method 700 returns to block 702 to start again. If a determination is made that the enrollment was successful, the partial method 700 continues with setting a user enrollment model that may be stored for authentication later in block 712. Following block 712, the partial method 700 continues with generating match scores for the detected gait samples in block 714. The partial method 700 may continue by making an authentication decision in block 718. The authentication decision 718 compares the match scores generated to determine if the average minimum distance of the centroid(s) of the detected gait to the centroid(s) of the enrollment model is above a threshold. The higher the match score the less likely a match is valid (i.e., this is not the correct user). If the determination is made in block 706 that the user is enrolled, the partial method 700 may continue with generating match scores in block 714 and determining if the gait detected matches the user based on the enrollment model in block 718. The partial method 700 may end after block 718. If the user is authenticated based on the collected samples in block 702, the user may then be able to use the device performing the partial method 700 or another device or devices communicatively coupled to the device performing the biometric authentication along with similar uses of biometric verification, such as unlocking a user's mobile device.

In addition, the partial method 700 may also continue after the user is determined to be enrolled (and authenticated as in block 718) in block 706 with collecting additional accelerometer samples in block 716 to provide an update mechanism for updating the enrollment model. The partial method 700 continues in block 720 with enrollment of the latest data collected. Next, a determination is made if the enrollment using the latest data collected was successful in block 722. If the determination is no, the partial method 700 returns to block 716 to collect more data. If the determination is yes, the partial method 700 continues with fusing (e.g., Fusion described above) the old model with the new enrollment model in block 724. Next, a determination is made whether the fused model is different from the old model in block 726. If the determination is no, the partial method 700 returns to block 716 to collect data. If the determination is yes, the partial method 700 continues in block 728 with notifying the user of the update model availability and requesting approval to use the updated model for future authentication decisions. In block 730, a determination is made whether the user approved the use of the updated model. If the determination is no, the partial method 700 returns to block 716 to collect data. If the determination is yes, the partial method 700 returns to block 712 to set a new enrollment model for the user. This optional process may provide a method for continuous model updates.

Figure 8:
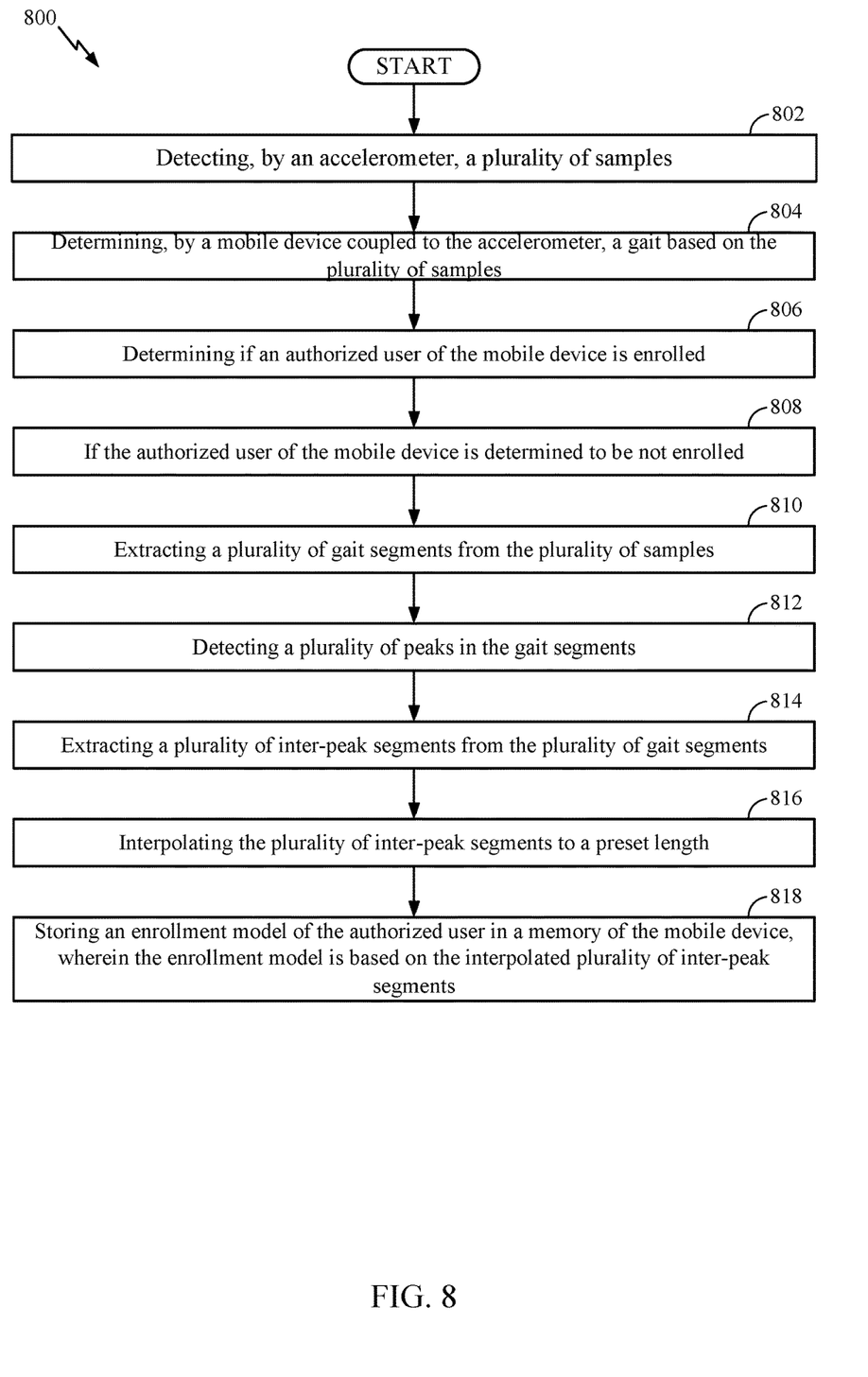
FIG. 8 illustrates an exemplary partial method for biometric verification in accordance with some examples of the disclosure.

FIG. 8 illustrates an exemplary partial method for biometric verification in accordance with some examples of the disclosure. As shown in FIG. 8, a partial method 800 may begin in block 802 with detecting, by an accelerometer, a plurality of samples. The partial method 800 may continue in block 804 with determining, by a mobile device coupled to the accelerometer, a gait based on the plurality of samples. The partial method 800 may continue in block 806 with determining if an authorized user of the mobile device is enrolled. If the authorized user is enrolled, block 808, the partial method 800 may continue with the following blocks. The partial method 800 may continue in block 810 with extracting a plurality of gait segments from the plurality of samples. The partial method 800 may continue in block 812 with detecting a plurality of peaks in the gait segments. The partial method 800 may continue in block 814 with extracting a plurality of inter-peak segments from the plurality of gait segments. The partial method 800 may continue in block 816 with interpolating the plurality of inter-peak segments to a preset length. The partial method 800 may conclude in block 818 with storing an enrollment model of the authorized user in a memory of the mobile device, wherein the enrollment model is based on the interpolated plurality of inter-peak segments. Optionally, determining if the inter-peak segments match the user model may comprise: detecting a plurality of cluster patterns in the plurality of gait samples; determining one of a plurality of centroids for each of the plurality of cluster patterns; comparing the plurality of centroids with a plurality of user model centroids to determine a match number; and determining the inter-peak segments matches the user model when the match number exceeds a threshold. Optionally, the determined match number may be based on an average minimum distance between each of the plurality of centroids and each of the plurality of user model centroids.

Figure 9:
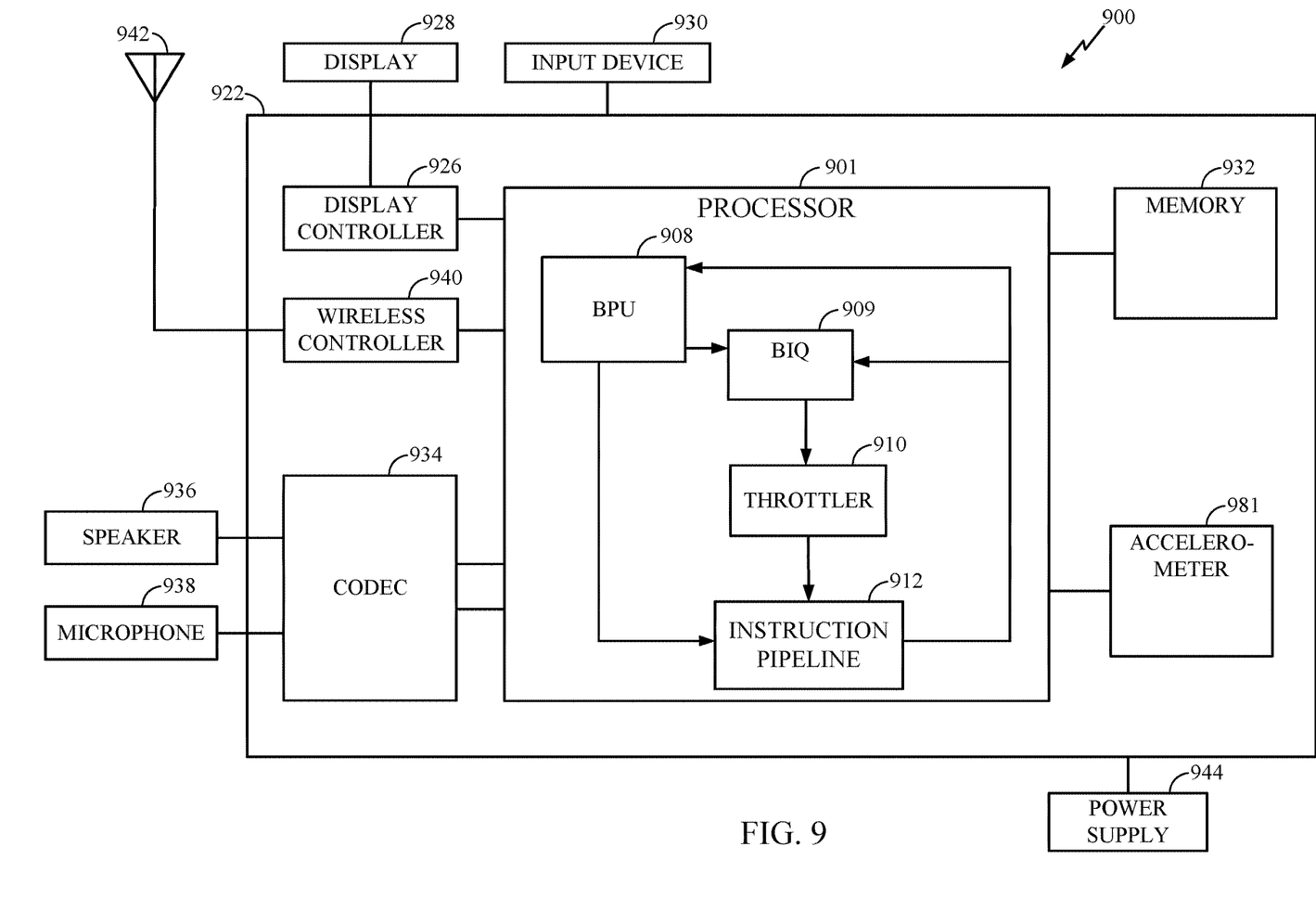
FIG. 9 illustrates an exemplary mobile device in accordance with some examples of the disclosure.

FIG. 9 illustrates an exemplary mobile device in accordance with some examples of the disclosure. Referring now to FIG. 9, a block diagram of a mobile device that is configured according to exemplary aspects is depicted and generally designated 900. In some aspects, mobile device 900 may be configured as a wireless communication device. As shown, mobile device 900 includes processor 901, which may be configured to implement the methods described herein in some aspects. Processor 901 is shown to comprise instruction pipeline 912, buffer processing unit (BPU) 908, branch instruction queue (BIQ) 909, and throttler 910 as is well known in the art. Other well-known details (e.g., counters, entries, confidence fields, weighted sum, comparator, etc.) of these blocks have been omitted from this view of processor 901 for the sake of clarity.

Processor 901 may be communicatively coupled to memory 932 over a link, which may be a die-to-die or chip-to-chip link. Mobile device 900 also include display 928 and display controller 926, with display controller 926 coupled to processor 901 and to display 928. Processor 901 may be communicatively coupled to an accelerometer 981 configured to detect a gait such as described above.

In some aspects, FIG. 9 may include coder/decoder (CODEC) 934 (e.g., an audio and/or voice CODEC) coupled to processor 901; speaker 936 and microphone 938 coupled to CODEC 934; and wireless controller 940 (which may include a modem) coupled to wireless antenna 942 and to processor 901.

In a particular aspect, where one or more of the above-mentioned blocks are present, processor 901, display controller 926, memory 932, CODEC 934, and wireless controller 940 can be included in a system-in-package or system-on-chip device 922. Input device 930 (e.g., physical or virtual keyboard), power supply 944 (e.g., battery), display 928, input device 930, speaker 936, microphone 938, wireless antenna 942, and power supply 944 may be external to system-on-chip device 922 and may be coupled to a component of system-on-chip device 922, such as an interface or a controller.

It should be noted that although FIG. 9 depicts a mobile device, processor 901 and memory 932 may also be integrated into a set top box, a music player, a video player, an entertainment unit, a navigation device, a personal digital assistant (PDA), a fixed location data unit, a computer, a laptop, a tablet, a communications device, a mobile phone, or other similar devices.

Figure 10:
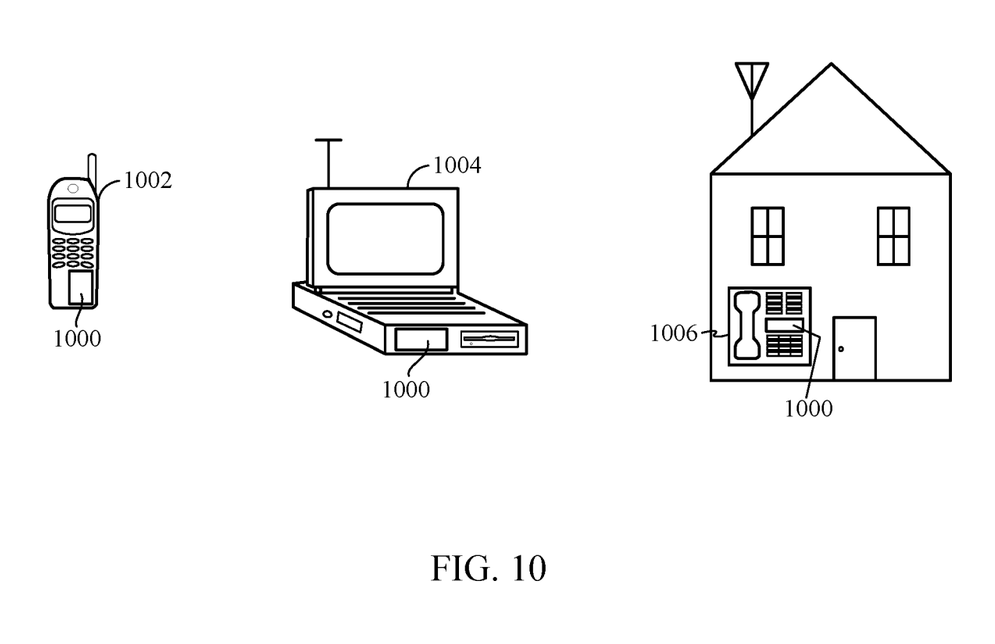
FIG. 10 illustrates various electronic devices that may be integrated with any of the aforementioned integrated device, semiconductor device, integrated circuit, die, interposer, package or package-on-package (PoP) in accordance with some examples of the disclosure.

FIG. 10 illustrates various electronic devices that may be integrated with any of the aforementioned integrated device, semiconductor device, integrated circuit, die, interposer, package or package-on-package (PoP) in accordance with some examples of the disclosure. For example, a mobile phone device 1002, a laptop computer device 1004, and a fixed location terminal device 1006 may include an integrated device 1000 as described herein. The integrated device 1000 may be, for example, any of the integrated circuits, dies, integrated devices, integrated device packages, integrated circuit devices, device packages, integrated circuit (IC) packages, package-on-package devices described herein. The devices 1002, 1004, 1006 illustrated in FIG. 10 are merely exemplary. Other electronic devices may also feature the integrated device 1000 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

It will be appreciated that various aspects disclosed herein can be described as functional equivalents to the structures, materials and/or devices described and/or recognized by those skilled in the art. For example, in one aspect, an apparatus may comprise means for detecting acceleration (see, e.g., accelerometer 981 in FIG. 9) and means for processing any of the aforementioned functions (see, e.g., processor 901 in FIG. 9). It will be appreciated that the aforementioned aspects are merely provided as examples and the various aspects claimed are not limited to the specific references and/or illustrations cited as examples.

One or more of the components, processes, features, and/or functions illustrated in FIGS. 1-10 may be rearranged and/or combined into a single component, process, feature or function or incorporated in several components, processes, or functions. Additional elements, components, processes, and/or functions may also be added without departing from the disclosure. It should also be noted that FIGS. 1-10 and its corresponding description in the present disclosure is not limited to dies and/or ICs. In some implementations, FIGS. 1-10 and its corresponding description may be used to manufacture, create, provide, and/or produce integrated devices. In some implementations, a device may include a die, an integrated device, a die package, an integrated circuit (IC), a device package, an integrated circuit (IC) package, a wafer, a semiconductor device, a package on package (PoP) device, and/or an interposer.

In this description, certain terminology is used to describe certain features. The term "mobile device" can describe, and is not limited to, a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

The wireless communication between electronic devices can be based on different technologies, such as code division multiple access (CDMA), W-CDMA, time division multiple access (TDMA), frequency division multiple access (FDMA), Orthogonal Frequency Division Multiplexing (OFDM), Global System for Mobile Communications (GSM), 3GPP Long Term Evolution (LTE), Bluetooth (BT), Bluetooth Low Energy (BLE) or other protocols that may be used in a wireless communications network or a data communications network. Bluetooth Low Energy (also known as Bluetooth LE, BLE, and Bluetooth Smart) is a wireless personal area network technology designed and marketed by the Bluetooth Special Interest Group intended to provide considerably reduced power consumption and cost while maintaining a similar communication range. BLE was merged into the main Bluetooth standard in 2010 with the adoption of the Bluetooth Core Specification Version 4.0 and updated in Bluetooth 5 (both expressly incorporated herein in their entirety).

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples and is not intended to be limiting of examples of the disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, actions, operations, elements, and/or components, but do not preclude the presence or addition of one or more other features, integers, actions, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be incorporated entirely within any form of computer-readable storage medium having stored therein a corresponding set of computer instructions that upon execution would cause an associated processor to perform the functionality described herein. Thus, the various aspects of the disclosure may be incorporated in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, action, feature, benefit, advantage, or equivalent to the public, regardless of whether the component, action, feature, benefit, advantage, or the equivalent is recited in the claims.

Further, those of skill in the art will appreciate that the various illustrative logical blocks, modules, circuits, and algorithm actions described in connection with the examples disclosed herein may be implemented as electronic hardware, computer software, or combinations of both. To clearly illustrate this interchangeability of hardware and software, various illustrative components, blocks, modules, circuits, and actions have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be incorporated directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art including non-transitory types of memory or storage mediums. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method action or as a feature of a method action. Analogously thereto, aspects described in connection with or as a method action also constitute a description of a corresponding block or detail or feature of a corresponding device. Some or all of the method actions can be performed by a hardware apparatus (or using a hardware apparatus), such as, for example, a microprocessor, a programmable computer or an electronic circuit. In some examples, some or a plurality of the most important method actions can be performed by such an apparatus.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions of this method.

Furthermore, in some examples, an individual action can be subdivided into a plurality of sub-actions or contain a plurality of sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for biometric verification, the method comprising:
   detecting, by an accelerometer, a plurality of samples;
   determining the plurality of samples indicated one of walking or non-walking;
   discarding the plurality of samples determined to indicate the non-walking;
   determining, by a mobile device coupled to the accelerometer, a gait based on the plurality of samples determined to indicate the walking; and for the gait:
  determining an authorized user of the mobile device is one of not enrolled or enrolled;
  for the authorized user of the mobile device determined to be not enrolled:
    collecting an initial plurality of gait samples;
    determining a peak for the initial plurality of gait samples;
    extracting inter-peak segments for the initial plurality of gait samples;
    interpolating the inter-peak segments of the initial plurality of gait samples to a preset length;
    generating an initial user model based on the interpolated inter-peak segments of the initial plurality of gait samples; and
    authenticating the user of the mobile device;
  for the authorized user of the mobile device determined to be enrolled:
    selecting a current user model;
    collecting a first plurality of gait samples;
    determining a peak for the first plurality of gait samples;
    extracting inter-peak segments for the first plurality of gait samples;
    interpolating the inter-peak segments of the first plurality of gait samples to a preset length;
    determining the interpolated inter-peak segments of the first plurality of gait samples matches the initial user model or not;
    authenticating the user of the mobile device for the interpolated inter-peak segments of the first plurality of gait samples determined to match the initial user model; and
  after authenticating the user of the mobile device;
    collecting a current plurality of gait samples;
    determining a peak for the current plurality of gait samples;
    extracting inter-peak segments for the current plurality of gait samples;
    interpolating the inter-peak segments of the current plurality of gait samples to a preset length;
    determining the interpolated inter-peak segments of the current plurality of gait samples matches the current user model or not;
    generating an updated user model based on the interpolated inter-peak segments of the current plurality of gait samples for the interpolated inter-peak segments of the current plurality of gait samples determined to not match the current user model.

2. The method of claim 1, wherein the determining if the inter-peak segments match the current user model comprises:
  detecting a plurality of cluster patterns in the plurality of gait samples;
  determining one of a plurality of centroids for each of the plurality of cluster patterns;
  comparing the plurality of centroids with a plurality of user model centroids to determine a match score; and
  determining the inter-peak segments match the user model when the match score exceeds a threshold.

3. The method of claim 2, wherein the match score is determined based on an average minimum distance between each of the plurality of centroids and each of the plurality of user model centroids.

4. The method of claim 1, further comprising, when the interpolated inter-peak segments of the current plurality of gait samples do not match the current user model:
  generating a fused user model based on the updated user model and the current user model;
  notifying the user of the mobile device of the fused user model;
  requesting permission from the user of the mobile device to update the current user model;
  updating the current user model with the fused user model when the requested permission is received.

5. The method of claim 4, wherein the fused user model comprises a cluster of the updated user model that is within a pre-defined distance of a cluster in the current user model and a cluster of the updated user model that is outside the pre-defined distance.

6. The method of claim 5, further comprising:
  determining if a total number of clusters in the current user model exceeds a threshold; and
  removing an oldest cluster from the current user model when the total number of clusters in the current user model exceeds the threshold.

7. The method of claim 1, wherein the memory is a ring buffer incorporated into the mobile device.

8. The method of claim 1, wherein the mobile device is incorporated into a device selected from the group consisting of a music player, a video player, an entertainment unit, a navigation device, a communications device, a mobile phone, a smartphone, a personal digital assistant, a tablet computer, a computer, a wearable device, and a laptop computer.

* * * * *